US012733666B2

(12) United States Patent
Juturu et al.

(10) Patent No.: US 12,733,666 B2
(45) Date of Patent: Sep. 15, 2026

(54) METHOD FOR IMPROVING INFLAMMATION, JOINT HEALTH, JOINT MOBILITY, AND JOINT COMFORT IN HEALTHY MAMMALS

(71) Applicant: LONZA CONSUMER HEALTH INC., Greenwood, SC (US)

(72) Inventors: Vijaya Juturu, North Bruswick, NJ (US); Kevin Owen, Dover, NH (US); Craig Coon, Fayetteville, AR (US)

(73) Assignee: LONZA CONSUMER HEALTH INC., Greenwood, SC (US)

( * ) Notice: Subject to any disclaimer, the term of this patent is extended or adjusted under 35 U.S.C. 154(b) by 596 days.

(21) Appl. No.: 18/040,548

(22) PCT Filed: Aug. 13, 2021

(86) PCT No.: PCT/US2021/045853

§ 371 (c)(1),
(2) Date: Feb. 3, 2023

(87) PCT Pub. No.: WO2022/040026

PCT Pub. Date: Feb. 24, 2022

(65) Prior Publication Data

US 2023/0284668 A1 Sep. 14, 2023

Related U.S. Application Data

(60) Provisional application No. 63/067,487, filed on Aug. 19, 2020.

(51) Int. Cl.

| | |
|---|---|
| ***A23J 3/06*** | (2006.01) |
| ***A23J 3/04*** | (2006.01) |
| ***A23K 20/147*** | (2016.01) |
| ***A23K 50/40*** | (2016.01) |
| ***A23L 29/281*** | (2016.01) |
| ***A23L 33/18*** | (2016.01) |

(52) U.S. Cl.
CPC ............ *A23L 33/18* (2016.08); *A23K 20/147* (2016.05); *A23K 50/40* (2016.05)

(58) Field of Classification Search
CPC ........ A61K 38/00; A61K 38/39; A61K 38/16; A23L 29/284; A23L 50/40
See application file for complete search history.

(56) References Cited

U.S. PATENT DOCUMENTS

| | | | | |
|---|---|---|---|---|
| 9,066,926 B2 | 6/2015 | Dijkstra et al. | | |
| 2016/0199456 A1* | 7/2016 | Smith | .................... | A61K 45/06 424/641 |
| 2023/0256060 A1* | 8/2023 | Juturu | ..................... | A61P 21/00 514/17.2 |

OTHER PUBLICATIONS

David C. Crowley et al: Safety and efficacy of undenatured type II collagen in the treatment of osteoarthritis of the knee: a clinical trial, International Journal of Medical Science, vol. 607141010, Jan. 1, 2009, pp. 312-321.

Gencoglu Hasan et al.: Undenatured Type II Collagen (UC-II) in Joint Health and Disease: A Review on the Current Knowledge of Companion Animals, vol. 10. No. 4. Apr. 17, 2020; https://www.ncbi.nlm.nih.gov/prns/articleles/PMC7222752/pdf/animals-10-00697.pdf.

Gupta R.C. et al: Therapeutic efficacy of undenatured type-II collagen (UC-II) in comparison to glucosamine and chondroitin in arthritic horses, Journal of Veterinary Pharmacology and Therapeutics. vol. 32, No. 6, Dec. 1, 2009, pp. 577-584.

International Search Report for PCT/US2021/045853 dated Oct. 20, 2021, 15 pages.

Prabhoo Ram et al. Undenatured collagen type II for the treatment of osteoarthritis: a review, International Journal of Research in Orthopedics, vol. 4, No. 5, Aug. 25, 2018, p. 684; http://www.ijoro.org/index.php/ijoro/article/viewfile/798/461.

Lugo et al., "Undenatured type II collagen (UC-11) for joint support: a randomized, double-blind, placebo-controlled study in healthy volunteers", Journal of the International Society of Sports Nutrition, vol. 10, Issue 48, 2013.

* cited by examiner

*Primary Examiner* — Maryam Monshipouri
(74) *Attorney, Agent, or Firm* — Dority & Manning, P.A.

(57) ABSTRACT

A supplement for improving one or more of joint pain, joint health, or inflammation in a healthy mammal. The supplement includes a type II collagen composition, where the type II collagen composition is present in the supplement in an amount sufficient to improve one or more of joint pain, joint health, joint mobility, or inflammation in a healthy mammal that is undergoing or that has undergone physical activity, as compared to the same mammal that has not been administered the supplement.

22 Claims, 4 Drawing Sheets

METHOD FOR IMPROVING INFLAMMATION, JOINT HEALTH, JOINT MOBILITY, AND JOINT COMFORT IN HEALTHY MAMMALS

BACKGROUND

In recent years, the use of collagen to treat various conditions has become exceedingly popular. Collagen is a protein that can be found in muscles, bones, skin, blood vessels, and in other parts of the body. There are various different types of collagen depending upon its function and form. For instance, Type I collagen, the most abundant collagen, is made of fibers found in tendons, ligaments, organs and skin. Type II collagen, on the other hand, primarily helps build cartilage, a major structural entity that sits on the surfaces of those bones which comprise articulating joints. Type III collagen is a major component of the extracellular matrix that makes up organs and skin. Type III collagen also forms blood vessels and tissue within the heart. Type IV collagen is found primarily in the skin as sheet-like structures in the cutaneous basal lamina. Furthermore, Collagen peptides are portions of one or more of the a strands of any type of collagen formed through enzymatic hydrolysis of collagen. Collagen peptides are often used in beverages and food products, as they are water-soluble and non-gelling.

Type II collagen acts through an oral tolerance mechanism of action, and entails the stimulation of T regulatory cells (Treg), located in gut associated lymphatic tissue, to specifically recognize antigenic determinants (epitopes) on the native collagen protein. Once induced, the Tregs exit the gut area and migrate to the joint space where they stimulate chondrocytes to lay down new Type II collagen thereby enhancing the structural integrity and flexibility of the articulating joint. One such example, for which clinical data has been published is the knee.

Furthermore, there have been studies that demonstrate the importance of physical training on joint strength and flexibility, as well as health benefits, including insulin sensitivity, reduced blood pressure, improved muscle metabolism and improved antioxidant system factors. However, other studies have documented a negative correlation between self-reported physical activity and increased inflammation. Furthermore, many younger mammals are required or expected to undergo demanding physical activity. For instance, hunting dogs, dogs that race, race horses, farm animals, and the like typically experience demanding exercise. During and after the intense exercise, skeletal muscle damage, joint damage, and/or adverse inflammation may occur, which may cause pain or discomfort to the mammal, and also, may require prolonged periods of recovery time after the physical exertion, limiting the mammal's training and performance.

Therefore, it would be a benefit to provide a method for reducing markers of inflammation in mammals that are undergoing, or have undergone, physical activity. Furthermore, it would be a benefit to provide a method for improving joint health and comfort in a healthy mammal, alone or in combination with physical activity. It would also be a benefit to provide a method for lessening pain related to physical activity, including joint pain. It would be a further benefit to provide a method for reducing or lessening cartilage, joint, or muscle damage during physical activity.

SUMMARY

The present disclosure is generally directed to a method of improving one or more of joint pain, joint health, joint mobility, or inflammation in a healthy mammal. The method includes administering a supplement to the mammal, where the supplement includes a type II collagen composition, the type II collagen composition including undenatured collagen, hydrolyzed collagen, or a combination thereof. Further, the type II collagen composition is present in the supplement in an amount sufficient to improve one or more of joint pain, joint health, joint mobility, or inflammation in a healthy mammal that is undergoing or that has undergone physical activity as compared to the same mammal that has not been administered the supplement, wherein the improvement is evidenced by a lower neutrophil to lymphocyte ratio, a lower platelet to lymphocyte ratio, a lower monocyte to lymphocyte ratio, a lower interleukin-6 level, or a lower pain index.

In one aspect, both the mammal administered the supplement, and a mammal that has not been administered the supplement, have previously undergone physical activity, are currently undergoing physical activity, or have previously undergone physical activity and are currently undergoing physical activity. Furthermore, in an aspect, the method further includes subjecting both the mammal administered the supplement, and a mammal that has not been administered the supplement to a time of physical activity, wherein the improvement of one or more of joint pain, joint health, joint mobility, or inflammation is measured after the time of physical activity. In yet another aspect, the time of physical activity is at least one week, where the improvement of one or more of joint pain, joint health, joint mobility, or inflammation is measured at the end of the at least one week.

Moreover, in a further aspect, the type II collagen composition is present in the supplement in an amount such that the mammal administered the type II collagen supplement exhibits a neutrophil to lymphocyte ratio that is at least about 5% lower than the same mammal that has not been administered the undenatured type II collagen supplement. Additionally or alternatively, in an aspect, the type II collagen composition is present in the supplement in an amount such that the mammal administered the type II collagen supplement exhibits a platelet to lymphocyte ratio that is at least about 5% lower than the same mammal that has not been administered the undenatured type II collagen supplement. Furthermore, in another aspect, the type II collagen composition is present in the supplement in an amount such that the mammal administered the type II collagen supplement exhibits a monocyte to lymphocyte ratio that is at least about 5% lower than the same mammal that has not been administered the undenatured type II collagen supplement. In one aspect, the type II collagen composition is present in the supplement in an amount such that the mammal administered the type II collagen supplement exhibits an interleukin-6 level that is at least about 2.5% lower than the same mammal that has not been administered the undenatured type II collagen supplement. In yet another aspect, the type II collagen composition is present in the supplement in an amount such that the mammal administered the type II collagen supplement exhibits a cartilage oligomeric matrix protein level that is at least about 1% lower than the same mammal that has not been administered the undenatured type II collagen supplement. Moreover, in one aspect, the type II collagen composition is present in the supplement in an amount such that the mammal administered the type II collagen supplement exhibits a pain index that is at least about 1% lower than the same mammal that has not been administered the undenatured type II collagen supplement.

In an aspect, the type II collagen composition is administered to the mammal daily. Additionally or alternatively, in one aspect, the type II collagen composition is administered to a mammal while the mammal is undergoing physical activity. In another aspect, the type II collagen composition is administered to a mammal while the mammal is undergoing intensive physical activity. Furthermore, in one aspect, the type II collagen composition is administered to the mammal as a food or beverage or with a food or beverage.

Furthermore, in yet another aspect, the type II collagen composition has a total oxygen radical absorbance capacity of about 200 μmol TE/g or greater. In one aspect, the supplement contains from about 1 milligram to about 5000 milligrams of the type II collagen composition. Moreover, in a further aspect, the supplement contains from about 10 milligrams to about 1000 milligrams of the type II collagen composition. In aspect, from about 1% to about 95% of the type II collagen composition is undenatured type II collagen. Additionally, in an aspect, the supplement contains from about 0.5 mg to about 2 mg of undenatured type II collagen.

In one aspect, the healthy mammal is a canine.

Other features and aspects of the present invention are described in more detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

Figure 1:
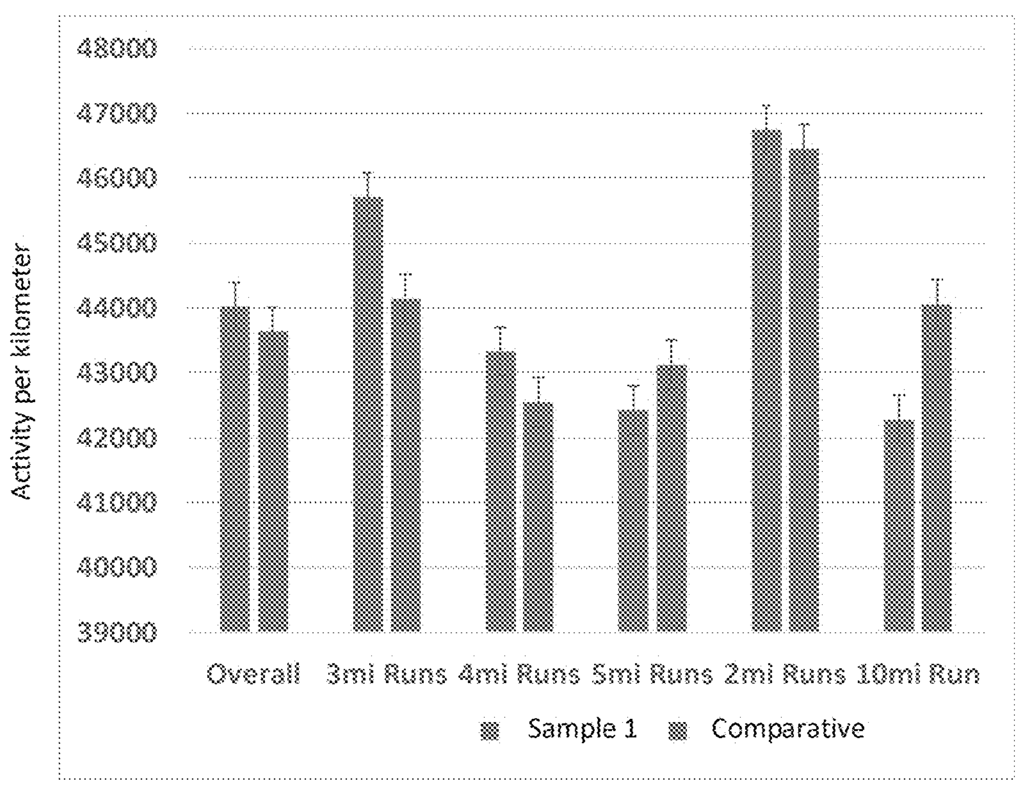
FIG. 1 shows a graph of Activity per kilometer for dogs tested according to Example 1.

Repeat use of reference characters in the present specification and drawing is intended to represent same or analogous features or elements of the invention.

Definitions

As used herein, the terms "about," "approximately," or "generally," when used to modify a value, indicates that the value can be raised or lowered by 10%, in one aspect, such as 8%, such as 5%, such as 4%, such as 3%, such as 2%, such as 1% in one aspect, and remain within the disclosed aspect.

The term "therapeutically effective amount" as used herein, shall mean that dosage, or amount of a composition, that provides the specific pharmacological or nutritional response for which the composition is administered or delivered to mammals in need of such treatment. It is emphasized that "therapeutically effective amount", administered to a particular subject in a particular instance, will not always be effective in treating the ailments or otherwise improve health as described herein, even though such dosage is deemed a "therapeutically effective amount" by those skilled in the art. Specific subjects may, in fact, be "refractory" to a "therapeutically effective amount". For example, a refractory subject may have a low bioavailability or genetic variability in a specific receptor, a metabolic pathway, or a response capacity such that clinical efficacy is not obtainable. It is to be further understood that the composition, or supplement, in particular instances, can be measured as oral dosages, or with reference to ingredient levels that can be measured in blood. In other embodiments, dosages can be measured in amounts applied to the skin when the composition is contained with a topical formulation.

The term "supplement" means a product in addition to the normal diet of the mammal but may be combined with a mammal's normal food or drink composition. The supplement may be in any form but not limited to a solid, liquid, gel, capsule, or powder. A supplement may also be administered simultaneously with or as a component of a food composition which may comprise a food product, a beverage, a pet food, a snack, or a treat. In one embodiment, the beverage may be an activity drink.

The term "nutraceutical" and refers to any compound added to a dietary source (e.g., a food, beverage, or a dietary supplement) that provides health or medical benefits in addition to its basic nutritional value.

The term "delivering" or "administering" as used herein, refers to any route for providing the composition, product, or a nutraceutical, to a subject as accepted as standard by the medical community. For example, the present disclosure contemplates routes of delivering or administering that include oral ingestion plus any other suitable route of delivery including transdermal, intravenous, intraperitoneal, intramuscular, topical and subcutaneous.

As used herein, the term "mammal" includes any mammal that may benefit from improved joint health, resilience, and recovery, and can include without limitation canine, equine, feline, bovine, ovine, human, or porcine mammals.

As used herein, "healthy" refers to the absence of illness or injury.

The term "physical activity" means activity that lasts about 10 minutes or more, such as about 25 minutes or more, such as about 30 minutes or more, such as at least about 45 minutes or more, and where the heart rate of the mammal reaches about 30% to about 85% of its maximum heart rate, such as about 40% to about 80%, such as about 50% to about 75% of the maximum heart rate of the mammal.

The term "intensive physical activity" means activity that lasts about 20 minutes or more, such as about 25 minutes or more, such as about 30 minutes or more, such as at least about 45 minutes or more, and where the heart rate of the mammal reaches about 50% to about 99% of its maximum heart rate, such as about 55% to about 95%, such as about 60% to about 90%, such as about 705 to about 85% of the maximum heart rate of the mammal.

The term "endurance" means an ability of a mammal to exert itself and remain active for a long period of time. Thus, in one aspect of the present disclosure, an improvement in endurance includes an increase in the amount of time of the physical activity, or the level of exertion during the physical activity over the same amount of time, or a combination thereof.

The term "sports nutrition" includes an improvement in recovery, activity, moving speed, explosive strength, rate of response, joint mobility, range of motion index, flexibility, performance, and/or stretching, or a combination thereof.

Unless otherwise noted, "collagen" as used herein refers to all forms of collagen, either with or without denaturation, without or without salts or stabilizing agents, and fibrillar and non-fibrillar types of collagen not limited to fibril associated collagens with interrupted triple helices (FACIT, Type IX, XII, XIV, XIX, XXI), including short chain collagen (generally Types VII and X), basement membrane (Type IV), Multiplexin (multiple triple helix domains with interruptions (Type XV, XVIII), and other types of collagen (Types VI, VII).

Other features and aspects of the present disclosure are discussed in greater detail below.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a method of improving inflammation, joint health, joint mobility, and joint comfort in healthy mammals. Particularly, the present disclosure has found that administering a type II collagen supplement according to the present disclosure unexpectedly improves joint health, joint comfort, or a combination thereof, in a mammal, as compared to the same mammal that was not administered the supplement. In particular, an undenatured type II collagen supplement was found to be effective for the purposes of this disclosure. Furthermore, the present disclosure has also found that such benefits may be displayed, or further improved if the mammal has undergone physical or intensive physical activity, is currently undergoing physical activity or intensive physical activity, or has both undergone and is undergoing physical or intensive physical activity, even as compared to a mammal that has similarly undergone and/or is undergoing generally the same physical or intensive physical activity. Additionally, the method of the present disclosure improves a gait index of a mammal, which quantifies characteristics of gait and lameness, allowing gait abnormalities to be identified and improved, as well as aids in diagnosing orthopedic, muscular, and neurologic disorders that affect gait.

Particularly, gait analysis may be used to determine the amount of joint flexibility, mobility, and discomfort exhibited by a mammal undergoing supplementation according to the present disclosure as compared to the same mammal that is not administered the undenatured type II collagen, either alone, or in conjunction with contemporaneous or prior physical activity. Particularly, gait index includes a gait lameness score, which is a combination of weight distribution and reach, total pressure index, which is weight distribution of each limb, with equal distribution as ideal (e.g. for a four legged mammal, ideal would be 25% per limb), hind reach, which is the length of reach of hind limbs, showing flexion and extension of the hip, where ideal is 50% of the step length, and step to stride ratio, which is the ratio of the length of the step and length of the stride, showing torque around the cervical or lumbar spine, with ideal at 50% per limb. For each parameter, the distance away from the ideal score is calculated and added together for each mammal to provide a gait index score. For instance, the gait index provides information about temporal and spatial gait characteristics, which can be improved using the method of the present disclosure.

Additionally, the gait index score and symmetry index can be further added together to yield a total pain index score. The symmetry index takes into account that all parameters in the gait index also have an ideal symmetry ratio of "1" between the left to right forelimbs and left to right hindlimbs, indicating a balanced gait. Distance from ideal is calculated and added together for each limb to provide a symmetry index. Further discussion of the gait analysis, symmetry index, and total pain index are shown below in example 1.

Therefore, in one aspect, the present disclosure has found that supplementation with a type II collagen supplement according to the present disclosure, either alone or in combination with physical activity or intensive physical activity, also resulted in a lower lower pain score. For instance, in one aspect, a mammal administered a type II collagen supplement according to the present disclosure exhibit a lower gait index as compared to the same mammal that has not been administered the undenatured type II collagen supplement of at least about of at least about 1% lower, such as at least about 2% lower, such as at least about 3% lower, such as at least about 4% lower, such as at least about 5% lower, such as at least about 6% lower, such as at least about 7% lower, such as at least about 8% lower, or any ranges or values therebetween. Furthermore, the mammal administered a type II collagen supplement according to the present disclosure may exhibit a lower total pain index score as compared to the same mammal that has not been administered the undenatured type II collagen supplement of at least about 1% lower, such as at least about 2% lower, such as at least about 3% lower, such as at least about 4% lower, such as at least about 5% lower, such as at least about 6% lower, such as at least about 7% lower, such as at least about 8% lower, such as at least about 9% lower, such as at least about 10% lower, or any ranges or values therebetween.

For instance, the present disclosure has found that a mammal administered a type II collagen supplement according to the present disclosure may exhibit an improvement in activity per kilometer as compared to the same mammal that has not been administered the undenatured type II collagen supplement, of about 1.5% or greater, such as about 2% or greater, such as about 3% or greater, such as about 4% or greater, such as about 5% or greater, such as about 7.5% or greater, such as about 10% or greater, or any ranges or values therebetween.

Additionally, the present disclosure has found that a mammal administered a type II collagen supplement according to the present disclosure may exhibit an improvement in run speed (measured in kilometers per hour), as compared to the same mammal that has not been administered the undenatured type II collagen supplement, of about 1.5% or greater, such as about 2% or greater, such as about 3% or greater, such as about 4% or greater, such as about 5% or greater, or any ranges or values therebetween.

In one aspect, the mammal may be trained, meaning that the mammal administered the supplement, the mammal that was not administered the supplement, or both the mammal administered the supplement and the mammal that was not administered the supplement, have undergone physical activity or intensive physical activity. In one aspect, the physical activity and/or intensive physical activity make take place for a period of time of about 1 day or more, such as about 5 days or more, such as about 1 week or more, such as about 2 weeks or more, such as about 3 weeks or more, such as about 4 weeks or more, such as about 6 weeks or more, such as about 8 weeks or more. In one aspect, the physical activity or intensive physical activity may be conducted in conjunction with supplementation (e.g. type II collagen is administered to the mammal while the mammal is undergoing training), where any one or more of the benefits discussed herein are measured at the end of one or more of the above time periods. Alternatively, in an aspect, the mammal is already trained, and is administered the supplement after training, and the increase in any one or more of the benefits discussed herein are measured after supplementation according to one or more of the above time periods. In yet a further aspect, the mammal may be trained prior to supplementation, and may also undergo further training in conjunction with the type II collagen supplementation.

Nonetheless, the present disclosure has found that supplementation with a type II collagen supplement according to the present disclosure, either alone or in combination with physical activity or intensive physical activity, also resulted in a decrease in inflammatory markers such as neutrophil to lymphocyte ratio, platelet to lymphocyte ratio, monocyte to lymphocyte ratio, and interleukin-6 (Il-6). For instance, in one aspect, a mammal administered a type II collagen supplement according to the present disclosure may exhibit a lower neutrophil to lymphocyte ratio as compared to the same mammal that has not been administered the undenatured type II collagen supplement of at least about 5% lower, such as at least about 10% lower, such as at least about 12.5% lower, such as at least about 15% lower, such as at least about 17.5% lower, such as at least about 20% lower, such as at least about 22.5% lower, such as at least about 25% lower. Furthermore, in one aspect, the lower neutrophil to lymphocyte ratio is observed even when both mammals have undergone, are undergoing, or have both undergone and are undergoing physical activity or intensive physical activity.

In one aspect, a mammal administered a type II collagen supplement according to the present disclosure may exhibit a lower platelet to lymphocyte ratio as compared to the same mammal that has not been administered the undenatured type II collagen supplement of at least about 5% lower, such as at least about 10% lower, such as at least about 12.5% lower, such as at least about 15% lower, such as at least about 17.5% lower, such as at least about 20% lower, such as at least about 22.5% lower, such as at least about 25% lower. Furthermore, in one aspect, the lower neutrophil to lymphocyte ratio is observed even when both mammals have undergone, are undergoing, or have both undergone and are undergoing physical activity or intensive physical activity.

Furthermore, in an aspect, a mammal administered a type II collagen supplement according to the present disclosure may exhibit a lower monocyte to lymphocyte ratio as compared to the same mammal that has not been administered the undenatured type II collagen supplement of at least about 5% lower, such as at least about 10% lower, such as at least about 12.5% lower, such as at least about 15% lower, such as at least about 17.5% lower, such as at least about 20% lower, such as at least about 22.5% lower, such as at least about 25% lower. Furthermore, in one aspect, the lower neutrophil to lymphocyte ratio is observed even when both mammals have undergone, are undergoing, or have both undergone and are undergoing physical activity or intensive physical activity.

Moreover, in one aspect, as discussed above, the mammal administered a type II collagen supplement according to the present disclosure may exhibit lower Il-6 levels in the blood of the mammal as compared to the same mammal that has not been administered the type II collagen supplement, even when both animals are trained, are currently undergoing physical or intensive physical activity, or are both trained and undergoing physical or intensive physical activity. For instance, in one aspect, a mammal administered a type II collagen supplement according to the present disclosure may exhibit lower Il-6 levels as compared to the same mammal that has not been administered the type II collagen supplement, where both mammals are trained, undergoing physical or intensive physical activity along with the supplementation as described above, or both trained and undergoing physical or intensive physical activity along with supplementation as described above, of at least about 2.5% lower, such as at least about 5% lower, such as at least about 7.5% lower, such as at least about 10% lower, such as at least about 15% lower, such as at least about 20% lower, such as at least about 25% lower, such as at least about 30% lower, such as at least about 35% lower, such as at least about 40% lower, such as at least about 45% lower, or any values or ranges therebetween.

Additionally, the present disclosure has found that supplementation with a type II collagen supplement according to the present disclosure, either alone or in combination with physical activity or intensive physical activity, also resulted in less cartilage damage, such as illustrated by lower cartilage oligomeric matrix protein (COMP) levels. For instance, in one aspect, a mammal administered a type II collagen supplement according to the present disclosure may exhibit lower COMP levels in the blood of the mammal as compared to the same mammal that has not been administered the undenatured type II collagen supplement of at least about 1% lower, such as at least about 2% lower, such as at least about 3% lower, such as at least about 4% lower, such as at least about 5% lower, such as at least about 6% lower, such as at least about 7% lower, or any ranges or values therebetween.

Nonetheless, in one aspect, the type II collagen according to the present disclosure is incorporated into the supplement as a collagen composition. The collagen composition may include one or more of any collagen as defined above, and/or, in one aspect, may include one or more of Type I collagen, Type II collagen, Type III collagen, Type IV collagen, or collagen peptides, or a mixture thereof. In one aspect, the collagen composition contains Type II collagen alone or in combination with one or more of Type I collagen, Type III collagen, Type IV collagen, or collagen peptides. In one aspect, the collagen composition may include a mixture of type II collagen (sometimes referred to as native type II collagen) and undenatured type II collagen. Additionally or alternatively, the collagen composition may include a mixture of native type II collagen and undenatured type II collagen, in addition to a further collagen, such as Type I, Type III, Type IV, or collagen peptides. Furthermore, in one aspect, the collagen composition includes whole collagen protein, biologically active peptide fragments of collagen, or a combination thereof.

In one aspect, one or more types of collagen in the collagen composition may be heat sterilized, such as by autoclaving, and/or may also include salts, such as alkalizing or acid, and/or organic or inorganic salts. Thus, in one aspect, a portion of the collagen may be at least partially hydrolyzed. In one aspect, the collagen is hydrolyzed by any process or compound, including by an acid base agent, an enzyme, heat or other temperature extreme, a chemical, UV, a salt, or combinations thereof. In one aspect, the hydrolyzed collagen is undenatured collagen that has been at least partially hydrolyzed by any method, and in one aspect, may include undenatured collagen that has any portion that has been denatured. However, as discussed, in one aspect, at least a portion of the collagen composition is undenatured.

As indicated above, in one aspect, the supplement contains a collagen composition, particularly a Type II collagen composition such as an undenatured Type II collagen composition, an at least partially hydrolyzed Type II collagen composition, or a combination thereof. Type II collagen for use in the present disclosure can be obtained from any suitable source. For instance, the collagen can be derived from a variety of mammalian sources, avian sources, or can be obtained from various fish species or a combination thereof. For instance, the collagen can be obtained from salmon, shark, poultry, porcine, eggshells, turkey cartilage, bovine cartilage, and the like. In one embodiment, for instance, the Type II collagen can be obtained as disclosed in U.S. Pat. No. 7,083,820 to Schilling which is incorporated by reference. For example, undenatured Type II collagen is available commercially as UC-II® brand from InterHealth Nutraceuticals. UC-II® brand is a natural ingredient that contains a glycosylated, undenatured Type II collagen. The collagen composition can also comprise a hydrolyzed collagen. The collagen composition can also comprise a pure protein or active peptide fragments. In one embodiment, the collagen composition can be free of any bone or bone material. In other embodiments, the collagen composition can be free of any transforming growth factors (TGFs), bone morphogenetic proteins (BMPs), or both. In still another embodiment, the collagen composition comprises Type II collagen and is completely free of any Type I collagen.

In preparing animal tissue for oral administration, in one embodiment, the Type II collagen containing tissue can be first dissected free of surrounding tissues and diced or otherwise comminuted into particles. The particulate, or milled, cartilage can be sterilized by means which do not affect or denature the structure of a major portion of the type II collagen in the tissue, such as low-temperature processing, and formed into doses containing therapeutically effective levels of undenatured type II collagen. Being a natural product some variation from sample to sample is to be expected. These variations can be minimized by blending after comminution. The blending can be aided by analytical techniques which allow the measurement of the amount of undenatured type II collagen and other constituents.

Nonetheless, the present disclosure has found that by carefully forming the particles and sterilizing the type II collagen as discussed above, the undenatured type II collagen may be resistant to gastric acid and digestive enzymes in the stomach. Due to this sterilization process, the undenatured type II collagen also retains its 3-dimensional shape, preserving the bioactive epitope regions. Without wishing to be bound by theory, it is believed that the epitope regions contain the ability to induce oral tolerance as discussed above. Particularly epitope regions allow undenatured collagen to bind to the Peyer's Patches, which have the ability to induce oral tolerance processes.

In one aspect, the type II collagen composition is present in the supplement in an amount from about 1 milligram to about 5000 milligrams. For instance, the collagen composition can be present in the supplement in an amount greater than about 5 milligrams, such as in an amount greater than about 10 milligrams, such as in an amount greater than about 15 milligrams, such as in an amount greater than about 20 milligrams, such as in an amount greater than about 25 milligrams, such as in an amount greater than about 30 milligrams. The total amount of collagen composition present in the supplement is generally less than about 1000 milligrams, such as less than about 900 milligrams, such as less than about 800 milligrams, such as less than about 700 milligrams, such as less than about 600 milligrams, such as less than about 500 milligrams, such as less than about 400 milligrams, such as less than about 300 milligrams, such as less than about 200 milligrams, such as less than about 100 milligrams, such as less than about 80 milligrams, such as less than about 70 milligrams, such as less than about 60 milligrams, or any ranges or values therebetween. Furthermore, it should be understood that, in one aspect, the collagen composition may be a type II collagen composition, where substantially all of the collagen in the collagen composition is type II collagen.

However, in one aspect, the amount of the type II collagen composition present in the supplement is based upon the type of mammal and/or the body weight of the healthy mammal. For instance, in one aspect, the healthy mammal is a canine having a body weight of about 25 kilograms (kg) to about 35 kg. In such an aspect, the supplement can contain from about 10 mg to about 100 mg of the type II collagen composition, such as from about 20 mg to about 80 mg, such as from about 30 mg to about 60 mg, such as about 35 mg to about 50 mg, or any ranges or values therebetween. Thus, in one aspect, a canine having a body weight higher or lower than 25 to 35 kilograms may have the dosage adjusted in proportion to the change in weight. Alternatively, however, in one aspect, all canines may receive a dosage according to the above range. Nonetheless, in one aspect, all mammals may receive a dosage according to the above ranges, and/or may have the above range adjusted proportionally based upon the mammal's bodyweight. However, it should be understood that, in one aspect, the dosage may be adjusted mammal to mammal, according to conversions known in the art, such as surface area ratios.

In one aspect, undenatured type II collagen may form all, or substantially all, of the total type II collagen in the collagen composition, and therefore, may be present in the supplement in the above discussed amounts. However, in one aspect, undenatured type II collagen may account for about 0.5% to about 95% of the total type II collagen and/or collagen composition, such as about 1% to about 75%, such as about 1.5% to about 50%, such as about 2% to about 40%, such as about 2.5% to about 15% of the total type II collagen or total collagen composition, or any ranges or values therebetween. Therefore, in one aspect, undenatured type II collagen may be present in the composition in an amount of 0.1 mg to about 100 mg, such as about 0.5 mg to about 75 mg, such as about 0.75 mg to about 50 mg, such as about 1 mg to about 30 mg, or any ranges or values therebetween.

Furthermore, in one aspect, the collagen composition may further include a preservative salt, such as potassium chloride. Thus, in one aspect, the total amounts of collagen composition discussed above may include type II collagen and/or undenatured type II collagen, alone or in combination with a further collagen, a preservative salt, or combinations thereof. In such as aspect, the total type II collagen, including native and undenatured type II collagen, may account for about 1% to about 99% of the collagen composition, such as about 2.5% to about 90%, such as about 5% to about 80%, such as about 7.5% to about 70%, such as about 10% to about 60%, such as about 15% to about 50%, such as about 20% to about 35%, or any ranges or values therebetween. Thus, in one aspect, the total amount of type II collagen, including native and undenatured type II collagen in the collagen composition may be from about 1 mg to about 1000 mg, such as about 2.5 mg to about 500 mg, such as about 5 mg to about 250 mg, such as about 7.5 mg to about 100 mg, such as about 10 mg to about 40 mg, or any ranges or values therebetween. Of course, in one aspect, no preservative salt is used.

Furthermore, in one aspect, when the type II collagen includes undenatured type II collagen, the undenatured type II collagen may have a large oxygen radical absorbance capacity (ORAC), as measured according to ORAC 6.0. Particularly, ORAC tests measure antioxidant scavenging activity against oxygen radicals that are known to be involved in the pathogenesis of aging and common disease, and consist of six types of ORAC assays that evaluate the antioxidant capacity of a material against primary reactive oxygen species, peroxyl radical, hydroxyl radical, superoxide anion, and peroxynitrite. Particularly, the ORAC assay includes introducing a reactive oxygen species (ROS) introducer to the assay system, where the ROS introducer triggers the release of a specific ROS which would degrade the probe and cause its emission wavelength or intensity to change. Thus, if the assay being tested includes an antioxidant, the antioxidant absorbs the ROS and preserves the probe from degradation. The degree of probe preservation indicates the antioxidant capacity of the material, and the results are expressed as μmol trolox equivalents (TE)/g of a tested material.

For example, an ORAC assay against peroxyl radical measures the antioxidant capacity of a sample to protect the fluorescent protein (fluorescein) from damage by a peroxyl radical which is generated from 2,2' azobis (2 amidinopropane) dihydrochloride (AAPH). The ORAC assay against hydroxyl radical measures the antioxidant capacity of the sample to protect the fluorescent protein (fluorescein) from damage by a hydroxyl radical which is generated from reaction between cobalt and hydrogen peroxide. The ORAC assay against peroxynitrite measures the antioxidant capacity of the sample to protect Dihydrorhodamine-123 from damage by a peroxynitrite radical which is generated from 3-morpholinosyndnonimine hydrochloride. The ORAC assay against superoxide measures the antioxidant capacity of the sample to protect hydroethidine from damage by a superoxide which is generated from xanthine oxidase. The ORAC assay against singlet oxygen measures the antioxidant capacity of the sample to protect hydroethidine from damage by single oxygen which is generated from a reaction between lithium molybdate and hydrogen peroxide. Finally, the ORAC assay against hypochlorite measures the antioxidant capacity of the sample to protect the fluorescent protein fluorescein from damage by the hypochlorite radical which is generated from sodium hypochlorite.

Thus, in one aspect, a collagen composition having an undenatured type II collagen according to the present disclosure may have a total ORAC of about 200 μmol TE/g or greater, such as about 250 μmol TE/g or greater, such as about 300 μmol TE/g or greater, such as about 350 μmol TE/g or greater, such as about 400 μmol TE/g or greater, such as about 450 μmol TE/g or greater, such as about 500 μmol TE/g or greater, such as about 550 μmol TE/g or greater, such as about 600 μmol TE/g or greater, such as about 700 μmol TE/g or greater, such as about 750 μmol TE/g or greater, such as about 800 μmol TE/g or greater, such as about 825 μmol TE/g or greater, up to about 1000 μmol TE/g, or any ranges or values therebetween.

Furthermore, in one aspect, a collagen composition having an undenatured type II collagen according to the present disclosure may have a ORAC against peroxyl radicals of about 1 μmol TE/g or greater, such as about 2.5 μmol TE/g or greater, such as about 5 μmol TE/g or greater, such as about 7.5 μmol TE/g or greater, such as about 10 μmol TE/g or greater, such as up to about 10.5 μmol TE/g or greater, up to about 50 μmol TE/g, or any ranges or values therebetween.

Similarly, in one aspect, a collagen composition having an undenatured type II collagen according to the present disclosure may have a ORAC against hydroxyl radicals of about 10 μmol TE/g or greater, such as about 15 μmol TE/g or greater, such as about 20 μmol TE/g or greater, such as about 25 μmol TE/g or greater, such as about 27.5 μmol TE/g or greater, such as about 30 μmol TE/g or greater, up to about 40 μmol TE/g, or any ranges or values therebetween.

Additionally or alternatively, in one aspect, a collagen composition having an undenatured type II collagen according to the present disclosure may have a ORAC against peroxynitrite of about 0.5 μmol TE/g or greater, such as about 1 μmol TE/g or greater, such as about 1.5 μmol TE/g or greater, such as about 2 μmol TE/g or greater, such as about 2.25 μmol TE/g or greater, up to about 5 μmol TE/g, or any ranges or values therebetween.

In one aspect, a collagen composition having an undenatured type II collagen according to the present disclosure may have a ORAC against singlet oxygen of about 500 μmol TE/g or greater, such as about 550 μmol TE/g or greater, such as about 600 μmol TE/g or greater, such as about 650 μmol TE/g or greater, such as about 700 μmol TE/g or greater, such as about 725 μmol TE/g or greater, up to about 1000 μmol TE/g, or any ranges or values therebetween.

Furthermore, in one aspect, a collagen composition having an undenatured type II collagen according to the present disclosure may have a ORAC against hypochlorite of about 25 μmol TE/g or greater, such as about 30 μmol TE/g or greater, such as about 35 μmol TE/g or greater, such as about 40 μmol TE/g or greater, such as about 45 μmol TE/g or greater, such as up to about 50 μmol TE/g or greater, up to about 75 μmol TE/g, or any ranges or values therebetween.

Furthermore, in one aspect, when the type II collagen includes undenatured type II collagen, the undenatured type II collagen may have a molecular weight of about 10,000 Daltons or more, such as about 15,000 Daltons or more, such as about 20,000 Daltons or more, such as about 25,000 Daltons or more, such as about 30,000 Daltons or more, such as about 35,000 Daltons or more, such as about 40,000 Daltons or more, such as about 45,000 Daltons or more, such as about 50,000 Daltons or more, such as about 55,000 Daltons or more, such as about 60,000 Daltons or more, such as about 65,000 Daltons or more, such as about 70,000 Daltons or more, such as about 75,000 Daltons or more, such as about 80,000 Daltons or more, such as about 85,000 Daltons or more, such as about 90,000 Daltons or more such as about 95,000 Daltons or more, such as about 100,000 Daltons or more, up to about 350,000 Daltons or less, or any ranges or values therebetween.

While various aspects and benefits have been discussed, in one aspect, the collagen composition is incorporated into a suitable delivery form prior to incorporation into a dosage form as discussed below. In one aspect, the composition of the present disclosure may be included as an oil-in-water emulsion as a delivery form. Particularly, in one aspect, such an arrangement may allow one or more oil-soluble and/or one or more water-soluble active ingredients to be contained in the same delivery form. Alternatively, only oil-soluble components may be used (e.g. the Type II collagen), and the emulsion may be used to incorporate the composition into a water-based application. However, it should be understood that, in one aspect, a water-soluble type II collagen may be used in the supplement.

Nonetheless, the oil-in-water emulsion may also contain at least one functional gum, such as gum arabic. Gum arabic, in general, is a complex mixture of glycoproteins and polysaccharides, including arabinose and galactose. Gum arabic is generally soluble in water and is edible. In some embodiments, the gum arabic may be comprised of a 100% modified gum arabic, such as Ticamulsion® A-2010 gum arabic powder. In certain embodiments, the gum arabic may be a mixture or blend of gum arabic and modified gum arabic. For example, in certain embodiments, the gum arabic may comprise Ticamulsion® 3020.

In certain aspects, the oil-in-water emulsion contains from about 10% to about 30% by weight of gum arabic. In some embodiments, the oil-in-water emulsion contains from about 15% to about 25% by weight of gum arabic. In some embodiments, the oil-in-water emulsion contains less than about 20% by weight of gum arabic, such as less than 15%, such as less than 10%, such at less than 5%.

The oil-in-water emulsion may also contain water. In certain aspects, the oil-in-water emulsion contains deionized water. Still, in certain aspects, the oil-in-water emulsion may contain any water suitable for human ingestion and incorporation into dietary supplements designed for human ingestion.

The amount of water incorporated into the oil-in-water emulsion can vary depending on the desired hygroscopic and water-soluble ingredients that are incorporated into the oil-in-water emulsion. In certain aspects, the oil-in-water emulsion may contain from about 5% to 35% by weight of water. In some embodiments, the oil-in-water emulsion may contain from about 10% to about 30% by weight of water. In some embodiments, the oil-in-water emulsion may contain from about 15% to about 20% by weight of water. In some embodiments, the oil-in-water emulsion may contain less than about 20% by weight of water, such as less than about 15% by weight of water, such as less than about 10% by weight of water.

In some aspects, the oil-in-water emulsion may contain one or more stabilizers or suspension promoting agents. For example, in certain aspects, the oil-in-water emulsion may contain one or more gum, such as gellan gum or xanthum gum. If included, the gellan gum or xanthum gum may be present in an amount of less than about 3.5% by weight of the oil-in-water emulsion, such as less than about 2.5% by weight, such as less than about 1.5% by weight, such as less than about 1.0% by weight, such as less than about 1.0% by weight.

In other aspects, the oil-in-water emulsion may contain one or more stabilizers such as silica. If included, silica may be present in an amount of less than about 2% by weight, such as less than about 1.5% by weight, such as less than about 1% by weight, such as less than about 0.5% by weight.

Furthermore, in one aspect, the oil-in-water emulsion may also contain one or more fat-soluble ingredients or nutrients. In certain aspects, the one or more fat-soluble ingredients or nutrients may be incorporated into the oil phase of the oil-in-water phase emulsion. Suitable fat-soluble ingredients include, but are not limited to retinol, vitamin E sourced from mixed tocopherols, beta carotene, ubiquinone, lecithin, sunflower lecithin, vitamin D, cannabinoids, hemp extracts, vitamin K, phosphatidyl choline, and combinations thereof.

In certain aspects, at least one or more fat-soluble ingredients may be incorporated in the oil-in-water emulsion in an amount of from about 0% by weight to about 50% by weight. For example, in some aspects, the oil-in-water emulsion contains less than about 50% by weight of one or more fat-soluble ingredients, such as less than about 40% by weight, such as less than about 30% by weight, such as less than about 20% by weight, such as less than about 10% by weight, such a less than about 5% by weight.

Moreover, in one aspect, the oil-in water emulsion may contain one or more additional antioxidants, in one or more of the water soluble phase, or the oil/fat soluble phase.

In some aspects, the oil-in-water emulsion disclosed herein may be used any suitable dosage form, such as tablets, gummy chewables, edible films, lozenges, liquid suspensions, syrups, lipid micelles, spray-dried dispersions, nanoparticles, and the like, which may also be incorporated into a further supplement.

Alternatively, the oil-in-water emulsion may be contained in a nutritional product, such as a supplement, a food product, or in a beverage. For example, in certain aspects, the oil-in-water emulsion may be incorporated into a liquid nutritional product, such as a nutritional supplement or infant formula, to be consumed by a mammal. Furthermore, the oil-in-water emulsions provided herein may be added to any liquid nutritional product designed to provide nutritional supplementation to a mammal.

The nutritional product can include any suitable composition for consumption by the mammal. Such compositions include complete foods or beverages intended to supply the necessary dietary requirements for mammal or food supplements such as treats and snacks. The food composition may comprise pellets, a drink, a bar, a prepared food contained in a can, a milk shake drink, a juice, a dairy food product, or any other functional food composition. The food composition may also comprise any form of a supplement such as a pill, soft gel, gummy figurine, wafer, powder, or the like.

Nonetheless, in one aspect, the supplement according to the present disclosure may be administered to the mammal including by oral, enteral or by-inhalation administration of whole collagen protein or biologically active peptide fragments of collagen. For instance, in one aspect, it is believed that the whole collagen protein or biologically active peptide fragments of collagen enhances the content of trans-L-hydroxyproline based on the total weight of amino acids contained in collagen type II, and enables efficient production of trans-L-hydroxyproline to enhance the efficacy.

The supplement composition of the present disclosure may further comprise one or more excipients as further additives in the composition. Exemplary but non-limiting excipients and/or additives include antiadherents, such as magnesium stearate; binders, such as saccharides, sugar alcohols, gelatin, and synthetic polymers; coatings, such as cellulose ether hydroxypropyl methylcellulose (HPMC), shellac, corn protein zein, gelatin, fatty acids, fats, oils and/or waxes; coloring agents, such as titanium oxide and azo dyes; disintegrants, such as modified starch sodium starch glycolate and crosslinked polymers including polyvinylpyrrolidone and sodium carboxymethyl cellulose; fillers, such as maltodextrin; flavoring agents, such as mint, liquorice, anise, vanilla, and fruit flavors including peach, banana, grape, strawberry, blueberry, raspberry, and mixed berry; glidants, such as fumed silica, talc, and magnesium carbonate; lubricants, such as talc, silica, and fats including vegetable stearin, magnesium stearate, and stearic acid; preservatives, such as antioxidants, vitamins, retinyl palmitate, selenium, the amino acids cysteine and methionine, citric acid, sodium citrate, and parabens; sorbents; sweeteners, such as sucrose and sucralose; and vehicles, such as petrolatum and mineral oil.

In one aspect, the supplement composition of the present disclosure may be combined with various additives and components that can improve one or more properties of the composition. For example, in one embodiment, the additive composition may be combined with a stabilizer package that may serve to stabilize at least one property of the composition. In one particular embodiment, for instance, a stabilizer package may be added to the composition in an amount sufficient to reduce the hydroscopic properties of the composition and/or prevent the composition from absorbing moisture. A stabilizer package may also be combined with the composition in order to improve the handling properties of the composition. For instance, the stabilizer package may allow the composition to have better flow properties, especially when in granular form.

In one aspect, the supplement composition may be combined with a polymer binder in conjunction with a stabilizer package. In addition, a coating material may also be applied to the composition after the composition has been combined with the polymer binder and the stabilizer package. The coating material, for instance, may contain at least one fat. In accordance with the present disclosure, the above components can be added to any suitable pharmaceutical composition in addition to the composition of the present disclosure. For instance, the above components may be added to any pharmaceutical composition containing a carnitine or an amino acid.

The polymer binder and the stabilizer package may be combined with the supplement composition in a manner that homogeneously incorporates the stabilizer package into the product. In one embodiment, for instance, the composition of the present disclosure is first combined with a polymer binder, such as through a spray dry process, and then combined with the stabilizer package. The polymer binder may comprise any suitable pharmaceutically acceptable polymer, such as film-forming polymers and/or polysaccharides. Particular examples of polymer binders that may be used in accordance with the present disclosure include starch, maltodextrin, gum arabic, arabinogalactan, gelatin, and mixtures thereof. In one embodiment, the polymer binder is added to the pharmaceutical composition in an amount of at least about 5% by weight, such as at least about 8% by weight, such as at least about 10% by weight, such as at least about 15% by weight. One or more polymer binders are present in the composition in an amount less than about 50% by weight, such as in an amount less than about 45% by weight, such as in an amount less than about 40% by weight, such as in an amount less than about 35% by weight, such as in an amount less than about 30% by weight.

In one embodiment, the polymer binder may comprise a starch, such as a modified starch. The starch, for instance, may be derived from corn or waxy maize. In one embodiment, the starch may comprise HI-CAP100 starch sold by National Starch and Chemical Company.

In an alternative embodiment, the polymer binder may comprise arabinogalactan. Arabinogalactan is a soluble polysaccharide that not only can serve as a polymer binder but may also provide other benefits. For instance, arabinogalactan may enhance the adaptive immune response in some circumstances. Arabinogalactan is described, for instance, in U.S. Pat. No. 8,784,844, which is incorporated herein by reference.

In one embodiment, larch arabinogalactan may be used as the polymer binder. Larch arabinogalactan is a highly branched polysaccharide that is composed of galactose units and arabinose units in the approximate ratio of 6:1. Larch arabinogalactan is extracted from large trees. The polysaccharide has a galactan backbone with side chains of galactose and arabinose. Arabinogalactan is commercially available from Lonza Consumer Health Inc, having offices in Morristown. NJ USA.

Once the polymer binder is combined with the composition such as through a spray dry process, the resulting mixture can then be combined with a stabilizer package. In one embodiment, the stabilizer package comprises oxide particles in combination with a salt of a carboxylic acid. In one particular embodiment, the stabilizer package may comprise a dry product, such as a powder or granular product that is combined with the composition and polymer binder. The combination of oxide particles and a salt of a carboxylic acid have been found to provide numerous advantages and benefits when combined with the composition. For instance, the stabilizer package has been found to stabilize the composition and make the composition less hydroscopic. The composition is also easier to handle and, when in granular form, produces a free-flowing product.

The oxide particles that may be added to the supplement composition may comprise silica. For instance, the oxide particles may comprise precipitated silica particles. The silica particles may have a particle size (d50, laser defraction following ISO Test 13320) of less than about 55 microns, such as less than about 40 microns, such as less than about 30 microns, such as less than about 25 microns, such as less than about 20 microns, such as less than about 15 microns, such as less than about 12 microns, such as less than about 10 microns, such as less than about 8 microns, such as less than about 6 microns, such as less than about 4 microns, such as less than about 2 microns, such as less than about 1 micron. The particle size is typically greater than about 0.5 microns, such as greater than about 1 micron. The particles may have a specific surface area (ISO Test 9277) of greater than about 120 m2/g, such as greater than about 130 m2/g, such as greater than about 150 m2/g, such as greater than about 170 m2/g, such as greater than about 200 m2/g, such as greater than about 220 m2/g. The specific surface area is generally less than about 500 m2/g. The oxide particles, such as the silica particles, can be present in the pharmaceutical composition in an amount greater than about 0.01% by weight, such as in an amount greater than about 0.05% by weight, such as in an amount greater than about 0.1% by weight. The oxide particles are generally present in an amount less than 5% by weight, such as in an amount less than about 2% by weight, such as in an amount less than about 1.5% by weight, such as in an amount less than 0.5% by weight.

In addition to the oxide particles, the stabilizer package may also include a salt of a carboxylic acid. The salt of a carboxylic acid may comprise a salt of a fatty acid. The fatty acid, for instance, may have a carbon chain length of from about 6 carbon atoms to about 40 carbon atoms, such as from about 12 carbon atoms to about 28 carbon atoms. In one embodiment, the salt of the carboxylic acid may comprise a stearate salt. The stearate salts that may be used include calcium stearate, sodium stearate, magnesium stearate, mixtures thereof, and the like. In one embodiment, the salts of the carboxylic acid may include both hydrophilic groups and hydrophobic groups. The salt of the carboxylic acid may be present in the composition in an amount greater than about 0.5% by weight, such as in an amount greater than about 1% by weight, such as in an amount greater than about 1.5% by weight. The salt of the carboxylic acid is generally present in an amount less than about 5% by weight, such as in an amount less than about 4% by weight, such as in an amount less than about 3% by weight.

In addition to the polymer binder and the stabilizer package, the composition may include various other components and ingredients. In one embodiment, for instance, the composition may contain a citric acid ester, such as a citric acid ester of a mono and/or diglyceride of a fatty acid. The composition may also contain a lecithin, such as a lecithin obtained from rapeseed, sunflower, and the like. The above components can be present in the composition in relatively minor amounts, such as less than about 2% by weight, such as less than about 1.5% by weight, such as less than about 1% by weight. The above components are generally present in an amount greater than about 0.05% by weight, such as in an amount greater than about 0.1% by weight.

Furthermore, in one aspect, the supplement may be formulated into a food and/or supplement for exercise, sport, or daily nutritional purposes. In such an aspect, the supplement may further include at least one vitamin, such as at least one of vitamin B, vitamin C, and vitamin E. Vitamins may be contained in the supplement in an amount of from about 50 μg/g of supplement to about 5000 μg/g, such as about 100 μg/g to about 4500, such as about 250 μg/g to about 4000 μg/g, such as about 400 μg/g to about 3500 μg/g, or any ranges or values therebetween. The above ranges may be for any one vitamin alone or a total amount of all vitamins. In one aspect, vitamin E is present in supplement in an amount of about 100 μg/g to about 1000 μg/g, such as about 250 μg/g to about 750 μg/g, such as about 400 μg/g to about 600 μg/g, or any ranges or values therebetween. In another aspect, vitamin C is present in supplement in an amount of about 1000 μg/g to about 5000 μg/g, such as about 2000 μg/g to about 4000 μg/g, such as about 3000 μg/g to about 3750 μg/g, or any ranges or values therebetween.

Furthermore, in an aspect, the supplement contains at least one mineral, such as at least one of potassium magnesium, zinc, or calcium. Minerals may be contained in the supplement in an amount of from about 1 mg/g to about 50 mg/g, such as about 2.5 mg/g to about 45 mg/g, such as about 5 mg/g to about 40 mg/g, or any ranges or values therebetween. The above ranges may be for any one mineral or a total amount of one mineral. In one aspect, the supplement contains potassium in an amount of about 9.5 mg/g to about 12 mg/g, such as about 9.75 mg/g to about 11.5 mg/g, such as about 10 mg/g to about 11 mg/g, or any ranges or values therebetween. Similarly, in one aspect, the supplement contains magnesium in an amount of about 1 mg/g to about 10 mg/g, such as about 2.5 mg/g to about 7.5 mg/g, such as about 4 mg/g to about 6 mg/g, or any ranges or values therebetween. Furthermore, in one aspect, the supplement contains calcium in an amount of about 1 mg/g to about 50 mg/g, such as about 2.5 mg/g to about 47.5 mg/g, such as about 5 mg/g to about 45 mg/g, such as about 10 mg/g to ab out 40 mg/g, such as about 20 mg/g to about 37.5 mg/g, such as about 30 mg/g to about 35 mg/g, or any ranges or values therebetween.

Additionally, the supplement may further include at least one additive that enhances sports performance or that contributes to reducing oxidative stress, such as an additionally antioxidant in combination with the collagen composition. For instance, in one aspect, an additive may be one or more of curcumin, *spirulina*, astaxanthin, or other carotenoids. Furthermore, in one aspect, the present disclosure may include one or more microalgae with a high superoxide dismutase (SOD) and/or ORAC level. Particularly, such microalgae may further help to reduce oxidative stress, and may contribute further anti-inflammatory properties and protection against infections, including improvement in immune health.

Moreover, in one aspect, an additive may include one or more prebiotics and/or probiotics. For instance, in one aspect, anti-fatigue probiotic bacteria, or prebiotic, for improving exercise performance, particularly the fatigue caused by exercise, may be included in the supplement to further improved one or more of endurance. Particularly, probiotic bacteria may further increase muscle mass and endurance, decreases blood lactate, ammonia, and creatine kinase concentration, and change body composition including metabolic health markers, as compared to the collagen composition alone.

Similarly, in one aspect, the collagen composition may be combined with a protein supplement, a creatine supplement, whey protein concentrate, whey protein isolate, or a combination thereof. Furthermore, in an aspect, the supplement can also include a cannabigerol, such as cannabidiol.

Furthermore, in an aspect, the supplement of the present disclosure can also include a mineral and branched-chain amino acid chelate, alone or in addition to a branched chain amino acid. Particularly, it has been found that a mineral and branched-chain amino acid chelate can increase absorption of the branched-amino acid in a mammal. Such an uptake may increase or maintain muscle mass in trained mammals or in individuals having diseases such as ALS, muscular dystrophy, sarcopenia associated with aging, or muscle atrophy associated with spinal cord injury. Furthermore, in an aspect, a mineral and branched-chain amino acid chelate as well as to decrease mental fatigue. Nonetheless, in one aspect, the branched chain amino acid may be one or more of leucine, isoleucine, and valine, and chelating a mineral with the one or more branched-chain amino acids. In one aspect, the mineral may be calcium, magnesium, zinc, or a mixture thereof. However, it should be understood that the mineral may also be a mineral source, such as a carbonate of the one or more minerals.

Nonetheless, in one aspect, for instance, as discussed above the supplement of the present disclosure may also be formulated to improve joint health, muscle health, cartilage heath, ligament heath, tendon health, bone health, or combinations thereof. For instance, the supplement can be used to improve non-arthritic joint pain, joint discomfort in healthy mammals, lack of joint flexibility in healthy mammals, muscle soreness in healthy mammals, or lack of fitness in healthy mammals. In addition, the supplement of the present disclosure can improve immune health, bone health, or brain health, and may also improve triglyceride and/or cholesterol levels in a healthy mammal and/or a mammal that is regularly undergoing physical activity and/or intense physical activity.

Furthermore, the supplement according to the present disclosure may also improve joint health, muscle health and soreness, and cartilage health that is caused by age related decline, underlying disease that may impact a healthy mammal at a later time, or prevent any decline in the above due to age related decline or underlying illness. For instance, in one aspect, the supplement according to the present disclosure may improve joint health, joint mobility, inflammation, cartilage health, or a combination thereof in a mammal predisposed, genetically or otherwise, to age related decline or diseases such as osteoarthritis. Particularly, in one aspect, supplementation to a mammal predisposed to such decline may mitigate the effects of the disease or age related decline, or delay the effects, improving the quality of life and life expectancy in the future, alone or in combination with physical activity.

Thus, in one aspect, the supplement according to the present disclosure may also include one or more additional joint supplements such as hydroxy citric acid, glucosamine, chondroitin, methylsulfonylmethane, eggshell membrane, green lipped muscle, or the like, or combinations thereof, and/or an enhancer of collagen absorption, such as vitamin c, in addition to the undenatured collagen.

Moreover, the supplement may be suitable for administration to any mammal. For instance, the mammal may be human or canine. The composition can be fed to a mammal of any age such as from parturition through the adult life in the mammal. In various embodiments the mammal may be a human, dog, a cat, a horse, a pig, a sheep, or a cow. In many embodiments, the mammal can be in early to late adulthood. For instance, the active mammal may have an age that is at least 10%, such as least 15%, such as least 20%, such as least 25%, such as least 30%, such as least 35%, such as least 40%, such as least 45%, such as least 50%, such as least 55%, such as least 60%, such as least 65%, such as least 70%, such as least 75%, such as least 85%, such as least 90%, such as least 95% of its expected life span. The mammal may have an age such that it is less than about 95%, such as less than about 90%, such as less than about 85%, such as less than about 80%, such as less than about 75%, such as less than about 70%, such as less than about 65%, such as less than about 60%, such as less than about 55%, such as less than about 50%, such as less than about 45%, such as less than about 40%, such as less than about 35%, such as less than about 30%, such as less than about 25%, such as less than about 20%, such as less than about 15%, such as less than about 10% of its expected life span. A determination of life span may be based on actuarial tables, calculations, or the like.

Furthermore, the present disclosure is also generally directed to a method of improving one or more of endurance, lipid metabolism, and antioxidant status of a mammal. For instance in one aspect, an undenatured type II collagen supplement as discussed herein may be administered to a mammal in an amount sufficient to exhibit an improvement in one or more of joint health and joint comfort. In one aspect, the mammal may be administered a supplement in an amount of about 1 mg to about 100 mg, such as about 1.5 mg to about 50 mg, such as about 2 mg to about 25 mg, such as about 2.5 mg to about 10 mg, such as about 3 mg to about 5 mg, where the undenatured type II collagen composition is contained in the supplement in the amounts discussed above.

Regardless of the amount of supplement administered, the supplement may be administered to the mammal about 5 times per day or less, such as about 4 times per day or less, such as about 3 times per day or less, such as about 2 times per day or less, such as about once per day, or alternatively, may be administered every other day, every third day, or once or twice per week according to any of the times per day discussed above.

In one aspect, as discussed above, the mammal that is being administered the supplement may also be undergoing physical or intensive physical activity, or may have previously undergone the physical or intensive physical activity. Additionally or alternatively, the mammal may be trained prior to undergoing physical or intensive physical activity as discussed above.

Regardless of the time of administration of the supplement and the level of physical activity, in one aspect, the supplement is administered alone, or in combination with physical or intensive physical activity, such that the mammal exhibits an improvement in one or more of endurance, lipid metabolism, and antioxidant status, as evidenced by the markers discussed above, after both supplementation and physical or intensive physical activity.

Nonetheless, certain embodiments of the present disclosure may be better understood according to the following examples, which are intended to be non-limiting and exemplary in nature.

EXAMPLE 1

Effect of Supplemental Undenatured Collagen on Inflammation and Joint Pain in Exercised Labrador Retrievers Forty healthy Labrador retrievers (20 male, 20 female) were used in this example having the following:

- body weights ranging from 22-38 kg with a mean of 30 kg;
- in fit condition when beginning the study, with body composition scores of 3 to 6;
- an age of 5 to 11 years with a mean of 7.5 years.

Twenty dogs received 40 mg per day of UC-II® brand undenatured type II collagen, and the remaining twenty dogs received a placebo.

All dogs were housed individually overnight and aired in social groups in outside yards for 6 hours per day, dependent upon weather and testing status. All dogs were fed their assigned diets and treatment (e.g. UC-II® brand undenatured type II collagen supplement labeled as example 1, or a placebo, labeled as comparative) once daily in the morning and had free access to automatic waterers at all times. All dogs were up to date on vaccinations and receive monthly prophylactic heartworm and parasite prevention.

All dogs began an outdoor endurance running program after a two week loading period. The running regimen was conducted as follows:

- weeks 3-5:2 miles twice weekly;
- weeks 6-8:4 miles twice weekly;
- weeks 9-11:5 miles twice weekly;
- week 12:2 miles twice weekly;
- week 13:10 miles once weekly, final run.

Figure 2:
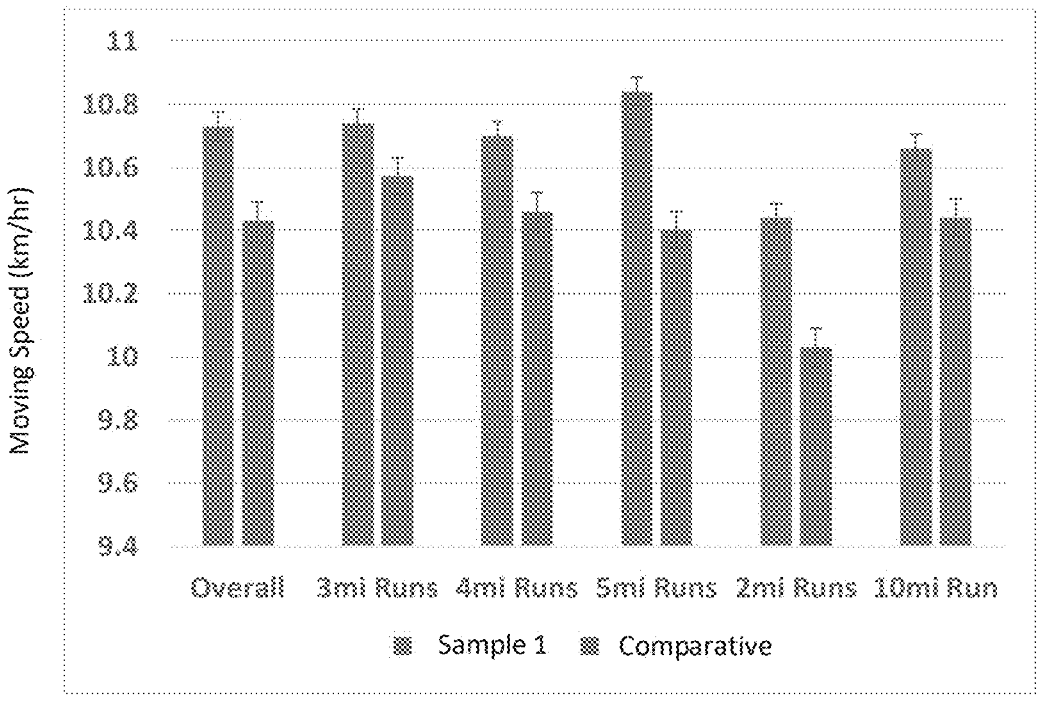
FIG. 2 shows a graph of Moving Speed in kilometers per hour for dogs tested according to Example 1.
Figure 3:
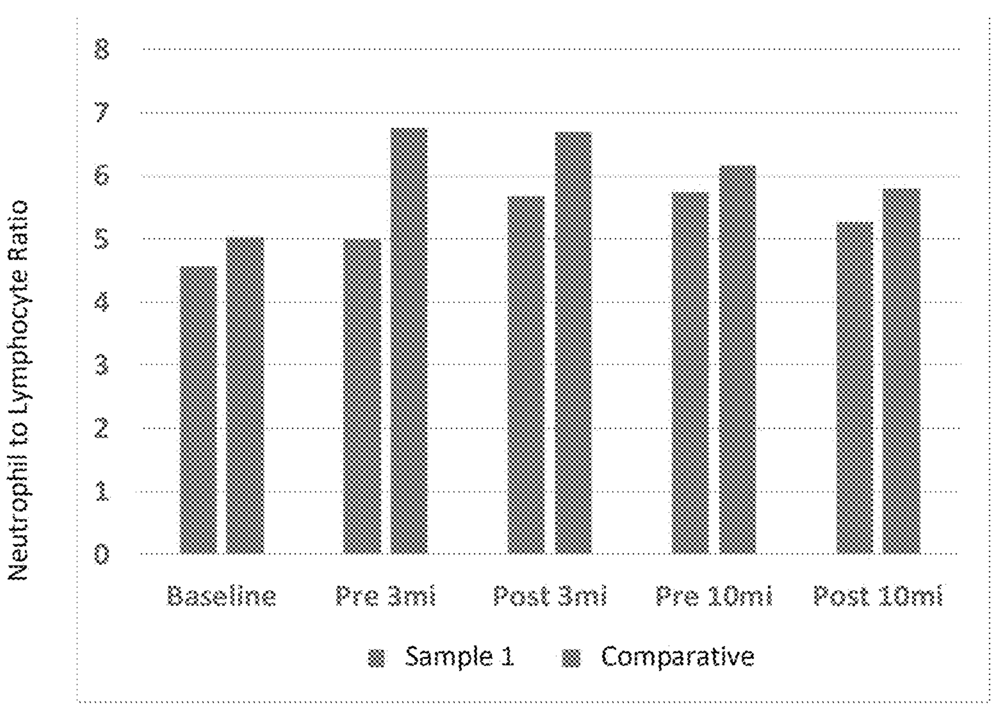
FIG. 3 shows a graph of Neutrophil to Lymphocyte Ratio for dogs tested according to Example 1.
Figure 4:
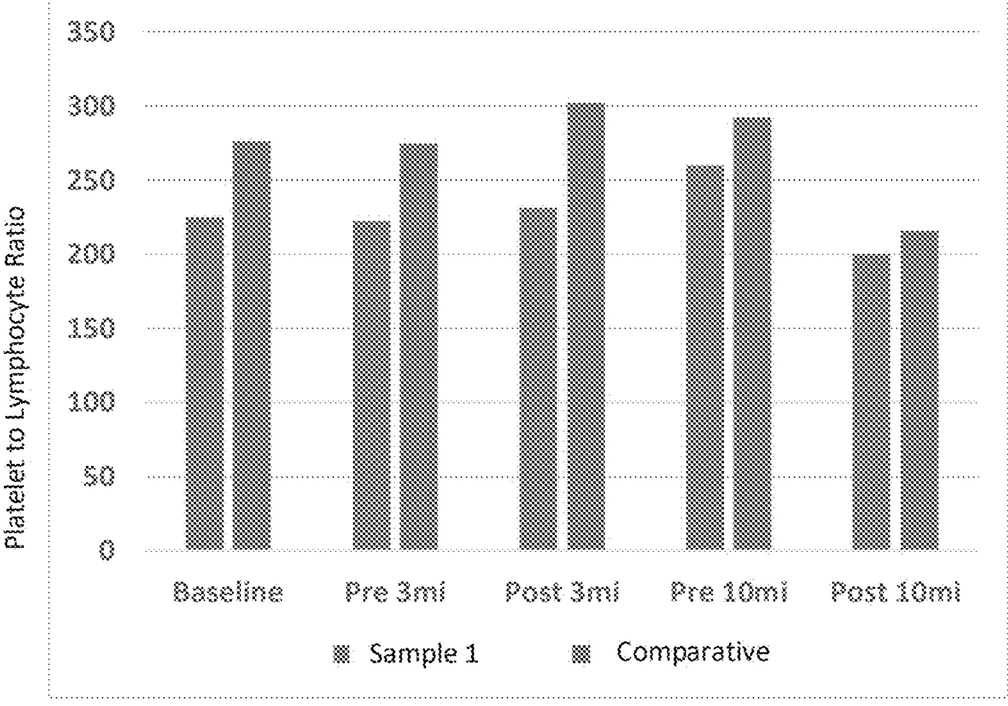
FIG. 4 shows a graph of Platelet to Lymphocyte Ratio for dogs tested according to Example 1.
Figure 5:
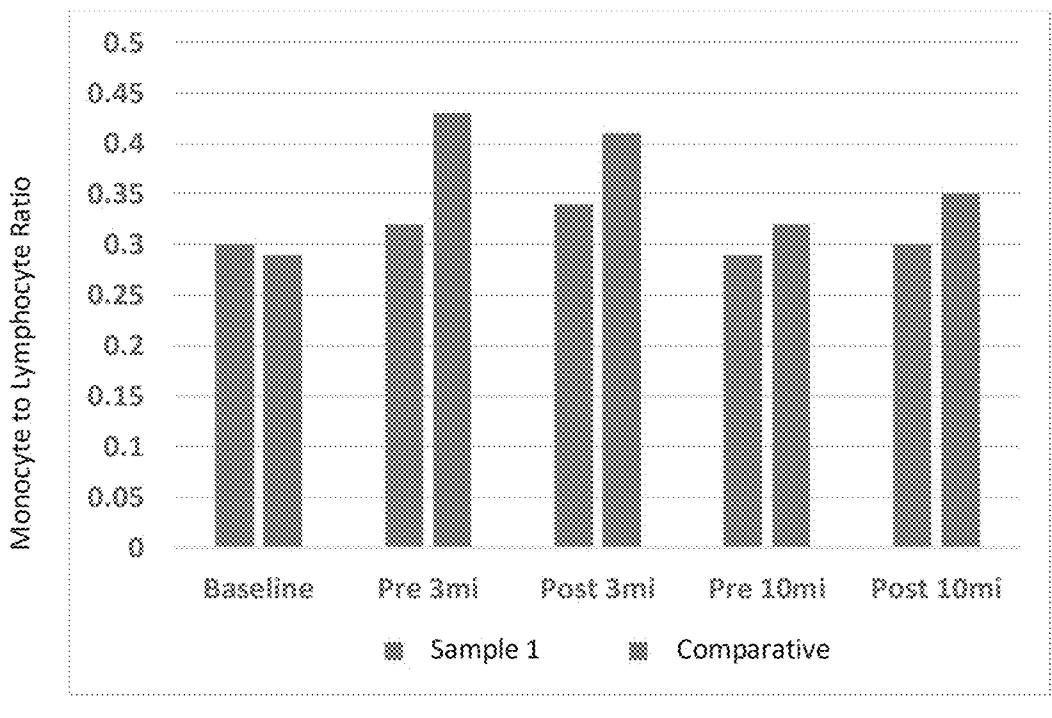
FIG. 5 shows a graph of Monocyte to Lymphocyte Ratio for dogs tested according to Example 1.
Figure 6:
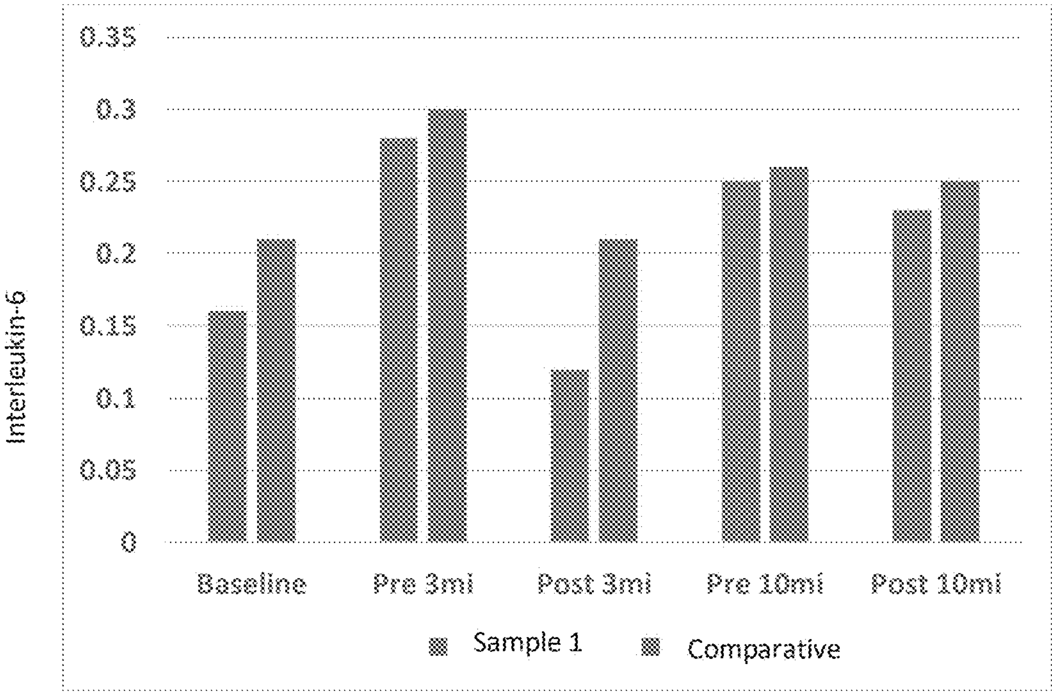
FIG. 6 shows a graph of Interleukin-6 concentration in nanograms/microliter (ng/mL) for dogs tested according to Example 1.
Figure 7:
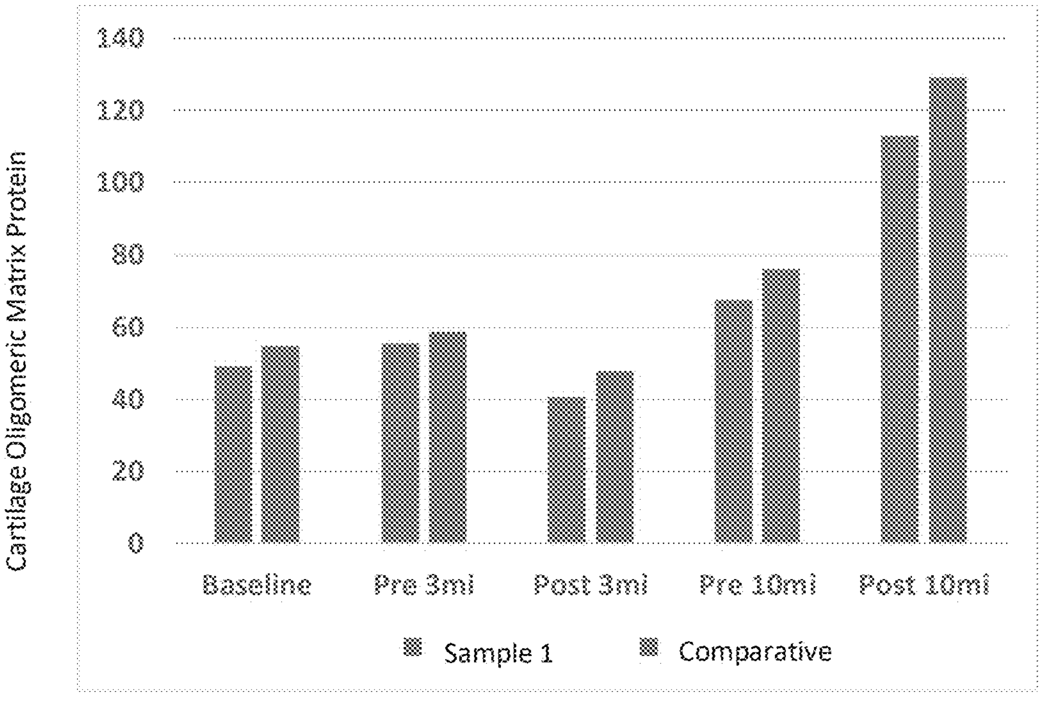
FIG. 7 shows a graph of Cartilage Oligomeric Matrix Protein concentration in (ng/ml) for dogs tested according to Example 1.

While running, all dogs wore an Article® accelerometer collars to quantify activity intensity, and Garmin® GPS collars to quantify distance and moving speed, the results of which are shown in FIGS. 1 and 2.

Gait analysis was performed using a pressure walkway (Gait4Dogs) at:

- Baseline;
- 24 hours prior to the first 3 mile run;
- 24 hours and 48 hours after the first 3 mile run;
- 24 hours prior to the 10 mile run; and
- 24 hours and 48 hours after the 10 mile run.

Each dog was passed over the walkway 6-12 times at each timepoint to obtain at least 3-4 valid walkway samples for analysis. A variety of temporal, pressure, and spatial parameters per limb for each valid walk were collected. Particularly, Gait Lameness Score is measured as a combination of weight distribution and reach, calculated by the Gait4Dogs software, where ideal at 100 per limb; Total Pressure Index was measured as the weight distribution of all four limbs, where ideal at 25% per limb; Hind Reach was measured as the length of reach of hind limbs, which shows flexion and extension of the hip, with ideal at 50% of the step length; and Step to Stride Ratio measured as the ratio of the length of step and length of stride, which Shows the torque around the cervical or lumber spine, where ideal is at 50% per limb. Calculations were also performed to provide all limb, front limb, and hind limb, averages as well as left:right front and hind limb symmetry ratios for each parameter. For each of these parameters, the distance away from the ideal score was calculated for each dog and added together to provide a pain index score which is shown in Tables 1-3.

TABLE 1

| Gate Lameness Score, Total Pressure Index, Hind Reach, and Step to Stride Ratio Index | | | |
|---|---|---|---|
| | UCII | Placebo | P-value |
| Baseline | 65.83 ± 2.21 | 65.88 ± 2.14 | 0.987 |
| Pre-Exercise | 60.70 ± 1.39 | 64.20 ± 1.43 | 0.067 |
| Post-Exercise | 62.07 ± 1.05 | 67.17 ± 1.05 | <0.001 |

TABLE 2

| Symmetry Index | | | |
|---|---|---|---|
| | UCII | Placebo | P-value |
| Baseline | 1.79 ± 0.09 | 1.69 ± 0.09 | 0.428 |
| Pre-Exercise | 1.68 ± 0.06 | 1.71 ± 0.06 | 0.554 |
| Post-Exercise | 1.69 ± 0.04 | 1.76 ± 0.04 | 0.238 |

TABLE 3

| Total Pain Index | | | |
|---|---|---|---|
| | UCII | Placebo | P-value |
| Baseline | 67.62 ± 2.26 | 67.57 ± 2.19 | 0.988 |
| Pre-Exercise | 62.38 ± 1.43 | 65.91 ± 1.47 | 0.079 |
| Post-Exercise | 63.76 ± 1.07 | 68.92 ± 1.07 | <0.001 |

As show in Table 1, the example group exhibited a significantly lower gate lameness score, total pressure index, hind reach, and step to stride ratio index and pain index score post-exercise, as compared to the dogs that received the placebo.

Biological sampling: blood samples were taken at:

Baseline;

24 hours prior to the first 3 mile run;

24 hours after the first 3 mile run;

24 hours prior to the 10 mile run; and 24 hours after the 10 mile run for biomarker and hematology purposes.

Biomarkers creatine kinase (CK), interleukin-6 (IL-6), and cartilage oligomeric matrix protein (COMP) were evaluated using commercially available ELISA kits. Hematology was analyzed using an automatic hematology machine (Abaxis HM5), and measured platelets (109/L and %), neutrophils (109/L and %), lymphocytes (109/L and %)), monocytes (109/L and %). The results of the biomarkers and hematology are shown in FIGS. 3 to 7.

Pain was assessed by subjective analysis using the LOAD questionnaire. Three trained technicians observed the dogs in their kennels and outside and scored the dogs based on:

pain at worst;

pain at least;

pain at average;

pain as it is now;

pain during general activity;

enjoyment of life;

ability to rise;

ability to walk;

ability to run;

ability to climb up;

how active is the dog;

stiffness after a lie down; and how keen is the dog to exercise. Data from all three technicians was compiled and analyzed, the results of which are shown in Tables 4 to 23.

TABLE 4

| Pain at worst | | | |
|---|---|---|---|
| | UCII | Placebo | P-Value |
| Baseline | $0.48^{b}$ ± 0.12 | $0.58^{b}$ ± 0.21 | 0.681 |
| Pre 3 mi | $0.45^{b}$ ± 0.11 | $0.63^{b}$ ± 0.21 | 0.467 |
| Post 3 mi | $0.60^{ab}$ ± 0.14 | $1.43^{ab}$ ± 0.32 | 0.021 |
| Pre 10 mi | $0.75^{ab}$ ± 0.18 | $1.38^{ab}$ ± 0.34 | 0.105 |
| Post 10 mi | $1.25^{a}$ ± 0.28 | $2.05^{a}$ ± 0.39 | 0.097 |
| P-value | 0.01 | 0.003 | |

TABLE 5

| Pain at least | | | |
|---|---|---|---|
| | UCII | Placebo | P-Value |
| Baseline | 0.15 ± 0.05 | 0.35 ± 0.13 | 0.155 |
| Pre 3 mi | 0.15 ± 0.05 | 0.35 ± 0.13 | 0.155 |
| Post 3 mi | 0.15 ± 0.05 | 0.50 ± 0.13 | 0.015 |
| Pre 10 mi | 0.15 ± 0.05 | 0.35 ± 0.10 | 0.098 |
| Post 10 mi | 0.25 ± 0.09 | 0.55 ± 0.13 | 0.063 |
| P-value | 0.765 | 0.648 | |

TABLE 6

| Pain at average | | | |
|---|---|---|---|
| | UCII | Placebo | P-Value |
| Baseline | $0.20^{b}$ ± 0.06 | 0.45 ± 0.17 | 0.176 |
| Pre 3 mi | $0.15^{b}$ ± 0.06 | 0.45 ± 0.17 | 0.101 |
| Post 3 mi | $0.23^{b}$ ± 0.05 | 0.70 ± 0.19 | 0.025 |
| Pre 10 mi | $0.33^{ab}$ ± 0.09 | 0.58 ± 0.16 | 0.177 |
| Post 10 mi | $0.73^{a}$ ± 0.19 | 1.15 ± 0.26 | 0.187 |
| P-value | 0.001 | 0.068 | |

TABLE 7

| Pain as it is now | | | |
|---|---|---|---|
| | UCII | Placebo | P-Value |
| Baseline | $0.18^{b}$ ± 0.06 | $0.45^{b}$ ± 0.17 | 0.135 |
| Pre 3 mi | $0.15^{b}$ ± 0.06 | $0.45^{b}$ ± 0.17 | 0.101 |
| Post 3 mi | $0.28^{b}$ ± 0.10 | $0.60^{b}$ ± 0.20 | 0.144 |
| Pre 10 mi | $0.30^{ab}$ ± 0.10 | $0.58^{b}$ ± 0.18 | 0.186 |
| Post 10 mi | $0.70^{a}$ ± 0.18 | $1.45^{a}$ ± 0.33 | 0.046 |
| P-value | 0.003 | 0.006 | |

TABLE 8

| Pain during general activity | | | |
|---|---|---|---|
| | UCII | Placebo | P-Value |
| Baseline | $0.08^{b}$ ± 0.04 | $0.20^{b}$ ± 0.11 | 0.287 |
| Pre 3 mi | $0.05^{b}$ ± 0.03 | $0.23^{ab}$ ± 0.12 | 0.152 |
| Post 3 mi | $0.10^{b}$ ± 0.06 | $0.33^{ab}$ ± 0.15 | 0.166 |
| Pre 10 mi | $0.25^{b}$ ± 0.10 | $0.45^{ab}$ ± 0.16 | 0.283 |
| Post 10 mi | $0.65^{a}$ ± 0.17 | $0.85^{a}$ ± 0.24 | 0.501 |
| P-value | <0.001 | 0.034 | |

TABLE 9

| Enjoyment of life | | | |
|---|---|---|---|
| | UCII | Placebo | P-Value |
| Baseline | $0.00^{b}$ ± 0.00 | 0.08 ± 0.04 | 0.079 |
| Pre 3 mi | $0.00^{b}$ ± 0.00 | 0.13 ± 0.07 | 0.092 |
| Post 3 mi | $0.00^{b}$ ± 0.00 | 0.15 ± 0.10 | 0.156 |
| Pre 10 mi | $0.05^{ab}$ ± 0.03 | 0.23 ± 0.12 | 0.152 |
| Post 10 mi | $0.20^{a}$ ± 0.08 | 0.43 ± 0.20 | 0.305 |
| P-value | 0.011 | 0.274 | |

TABLE 10

| Ability to rise | | | |
|---|---|---|---|
| | UCII | Placebo | P-Value |
| Baseline | $0.00^{b}$ ± 0.00 | $0.08^{b}$ ± 0.04 | 0.079 |
| Pre 3 mi | $0.00^{b}$ ± 0.00 | $0.18^{ab}$ ± 0.11 | 0.105 |
| Post 3 mi | $0.00^{b}$ ± 0.00 | $0.13^{b}$ ± 0.07 | 0.092 |
| Pre 10 mi | $0.18^{a}$ ± 0.08 | $0.33^{ab}$ ± 0.14 | 0.355 |
| Post 10 mi | $0.33^{a}$ ± 0.10 | $0.63^{a}$ ± 0.21 | 0.200 |
| P-value | <0.001 | 0.019 | |

TABLE 11

| Ability to walk | | | |
|---|---|---|---|
| | UCII | Placebo | P-Value |
| Baseline | 0.23 ± 0.08 | $0.30^{b}$ ± 0.10 | 0.573 |
| Pre 3 mi | 0.20 ± 0.08 | $0.30^{b}$ ± 0.10 | 0.448 |
| Post 3 mi | 0.20 ± 0.08 | $0.43^{ab}$ ± 0.14 | 0.175 |
| Pre 10 mi | 0.38 ± 0.12 | $0.48^{ab}$ ± 0.17 | 0.627 |
| Post 10 mi | 0.50 ± 0.23 | $0.93^{a}$ ± 0.23 | 0.118 |
| P-value | 0.1488 | 0.0329 | |

TABLE 12

| Ability to run | | | |
|---|---|---|---|
| | UCII | Placebo | P-Value |
| Baseline | $0.23^{b}$ ± 0.08 | $0.30^{b}$ ± 0.10 | 0.573 |
| Pre 3 mi | $0.23^{b}$ ± 0.08 | $0.30^{b}$ ± 0.10 | 0.573 |
| Post 3 mi | $0.20^{b}$ ± 0.08 | $0.45^{b}$ ± 0.16 | 0.159 |
| Pre 10 mi | $0.38^{ab}$ ± 0.12 | $0.60^{ab}$ ± 0.22 | 0.375 |
| Post 10 mi | $0.85^{a}$ ± 0.23 | $1.28^{a}$ ± 0.33 | 0.291 |
| P-value | 0.002 | 0.004 | |

TABLE 13

| Ability to climb up | | | |
|---|---|---|---|
| | UCII | Placebo | P-Value |
| Baseline | $0.03^{b}$ ± 0.03 | 0.08 ± 0.04 | 0.311 |
| Pre 3 mi | $0.00^{b}$ ± 0.00 | 0.08 ± 0.04 | 0.079 |
| Post 3 mi | $0.00^{b}$ ± 0.00 | 0.13 ± 0.07 | 0.092 |
| Pre 10 mi | $0.05^{ab}$ ± 0.03 | 0.33 ± 0.17 | 0.116 |
| Post 10 mi | $0.20^{a}$ ± 0.09 | 0.53 ± 0.20 | 0.146 |
| P-value | 0.008 | 0.05 | |

TABLE 14

| How active is the dog? | | | |
|---|---|---|---|
| | UCII | Placebo | P-Value |
| Baseline | 1.20 ± 0.07 | 1.45 ± 0.12 | 0.077 |
| Pre 3 mi | 1.18 ± 0.07 | 1.50 ± 0.13 | 0.03 |
| Post 3 mi | 1.30 ± 0.10 | 1.50 ± 0.13 | 0.229 |
| Pre 10 mi | 1.40 ± 0.12 | 1.58 ± 0.13 | 0.328 |
| Post 10 mi | 1.43 ± 0.12 | 1.70 ± 0.15 | 0.151 |
| P-value | 0.266 | 0.703 | |

TABLE 15

| Stiffness after a lie down | | | |
|---|---|---|---|
| | UCII | Placebo | P-Value |
| Baseline | $1.03^{b}$ ± 0.03 | 1.10 ± 0.05 | 0.170 |
| Pre 3 mi | $1.00^{b}$ ± 0.00 | 1.10 ± 0.05 | 0.041 |
| Post 3 mi | $1.05^{b}$ ± 0.03 | 1.10 ± 0.05 | 0.402 |
| Pre 10 mi | $1.23^{a}$ ± 0.09 | 1.15 ± 0.07 | 0.511 |
| Post 10 mi | $1.23^{a}$ ± 0.08 | 1.30 ± 0.11 | 0.586 |
| P-value | 0.0077 | 0.173 | |

TABLE 16

| How keen is the dog to exercise? | | | |
|---|---|---|---|
| | UCII | Placebo | P-Value |
| Baseline | $1.15^{b}$ ± 0.07 | 1.23 ± 0.08 | 0.488 |
| Pre 3 mi | $1.15^{b}$ ± 0.07 | 1.25 ± 0.09 | 0.363 |
| Post 3 mi | $1.35^{ab}$ ± 0.11 | 1.28 ± 0.09 | 0.597 |
| Pre 10 mi | $1.55^{ab}$ ± 0.13 | 1.48 ± 0.14 | 0.693 |
| Post 10 mi | $1.58^{a}$ ± 0.13 | 1.58 ± 0.16 | 0.999 |
| P-value | 0.004 | 0.121 | |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A method of improving one or more of joint pain, joint health, joint mobility, or inflammation in a healthy mammal, comprising:

administering a supplement to the mammal, the supplement comprising a type II collagen composition, the type II collagen composition comprising undenatured collagen, hydrolyzed collagen, or a combination thereof, wherein the type II collagen composition comprises about 1.5% to about 50% undenatured collagen, wherein the type II collagen composition is present in the supplement in an amount sufficient to improve one or more of joint pain, joint health, joint mobility, or inflammation in a healthy mammal that is undergoing or that has undergone physical activity as compared to the same mammal that has not been administered the supplement, further wherein the type II collagen composition is present in the supplement in an amount such that the healthy mammal administered the type II collagen supplement exhibits a neutrophil to lymphocyte ratio, a platelet to lymphocyte ratio, and a monocyte to lymphocyte ratio that is at least about 5% lower than a neutrophil to lymphocyte ratio, a platelet to lymphocyte ratio, and a monocyte to lymphocyte ratio exhibited by the same mammal that has not been administered the supplement.

2. The method of claim 1, wherein both the mammal administered the supplement, and a mammal that has not been administered the supplement, have previously undergone physical activity, are currently undergoing physical activity, or have previously undergone physical activity and are currently undergoing physical activity.

3. The method of claim 1, wherein the method further includes subjecting both the mammal administered the supplement, and a mammal that has not been administered the supplement to a time of physical activity, wherein the improvement of one or more of joint pain, joint health, joint mobility, or inflammation is measured after the time of physical activity.

4. The method of claim 1, wherein the time of physical activity is at least one week, and wherein the improvement of one or more of joint pain, joint health, joint mobility, or inflammation is measured at the end of the one week.

5. The method of claim 1, wherein the type II collagen composition is present in the supplement in an amount such that the mammal administered the type II collagen supplement exhibits a neutrophil to lymphocyte ratio that is at least about 10% lower than the same mammal that has not been administered the undenatured type II collagen supplement.

6. The method of claim 1, wherein the type II collagen composition is present in the supplement in an amount such that the mammal administered the type II collagen supplement exhibits a platelet to lymphocyte ratio that is at least about 10% lower than the same mammal that has not been administered the undenatured type II collagen supplement.

7. The method of claim 1, wherein the type II collagen composition is present in the supplement in an amount such that the mammal administered the type II collagen supplement exhibits a monocyte to lymphocyte ratio that is at least about 10% lower than the same mammal that has not been administered the undenatured type II collagen supplement.

8. The method of claim 1, wherein the type II collagen composition is present in the supplement in an amount such that the mammal administered the type II collagen supplement exhibits an interleukin-6 level that is at least about 2.5% lower than the same mammal that has not been administered the undenatured type II collagen supplement.

9. The method of claim 1, wherein the type II collagen composition is present in the supplement in an amount such that the mammal administered the type II collagen supplement exhibits a cartilage oligomeric matrix protein level that is at least about 1% lower than the same mammal that has not been administered the undenatured type II collagen supplement.

10. The method of claim 1, wherein the type II collagen composition is present in the supplement in an amount such that the mammal administered the type II collagen supplement exhibits a pain index that is at least about 1% lower than the same mammal that has not been administered the undenatured type II collagen supplement.

11. The method of claim 1, wherein the type II collagen composition is administered to the mammal daily.

12. The method of claim 1, wherein the type II collagen composition is administered to a mammal while the mammal is undergoing physical activity.

13. The method of claim 1, wherein the type II collagen composition is administered to a mammal while the mammal is undergoing intensive physical activity.

14. The method of claim 1, wherein the type II collagen composition is administered to the mammal as a food, a beverage, a powdered supplement, a liquid supplement, or a water-soluble supplement.

15. The method of claim 1, wherein the type II collagen composition has a total oxygen radical absorbance capacity of about 200 μmol trolox equivalents (TE)/g or greater.

16. The method of claim 1, wherein the supplement contains from about 1 milligram to about 5000 milligrams of the type II collagen composition.

17. The method of claim 1, wherein the supplement contains from about 10 milligrams to about 1000 milligrams of the type II collagen composition.

18. The method of claim 1, wherein from about 2% to about 40% of the type II collagen composition is undenatured type II collagen.

19. The method of claim 1, wherein the healthy mammal is a human or a canine.

20. The method of claim 1, wherein the healthy mammal is a canine.

21. The method of claim 1, wherein the type II collagen composition comprises a preservative salt.

22. The method of claim 21, wherein type II collagen composition comprises about 1% to about 50% of the preservative salt.

* * * * *